Feb. 27, 1968   P. J. F. ATKINS   3,370,896
SUSPENSION OF VERTICAL SHAFTS
Filed Sept. 10, 1965   2 Sheets-Sheet 1

United States Patent Office 3,370,896
Patented Feb. 27, 1968

3,370,896
SUSPENSION OF VERTICAL SHAFTS
Peter James Frederick Atkins, Manchester, England, assignor to Associated Electrical Industries Limited, London England, a British company
Filed Sept. 10, 1965, Ser. No. 486,316
Claims priority, application Great Britain, Sept. 18, 1964, 38,192/64
17 Claims. (Cl. 308—10)

This invention relates to improvements in the suspension of vertical shafts, and finds particular application in the suspension of the vertical shaft of an electrical watthour meter.

It is well known to support such a vertical shaft by the repulsion forces between two axially facing magnet poles, one mounted on the shaft to be supported and one mounted on the housing for the shaft and for a meter disc carried by that shaft. Conveniently the two magnet poles are mounted at or near the lower end of the shaft, and are in the form of rings of permanent-magnet material. The permanent-magnet material used has changed from time-to-time with developments of new material, and at the present time an oxide material such as barium ferrite would be used.

Barium ferrite is a ceramic and is therefore very hard and brittle, and other oxide materials tend to have similar physical characteristics which make them difficult to bring to close-tolerance dimensions except by operations such as grinding. A ring-like ferrite magnet of the type required for a meter suspension would be formed typically by powdering of the barium ferrite, and pressing it into the desired shape after mixing with a suitable binder. The shaped magnet is then fired to render it stable, and during this firing the dimensions of the magnet tend to change, shrinkage normally taking place.

Because of this shrinkage, and the hardness and brittleness of the formed magnet ring, difficulties are experienced in providing a suitable mounting for these magnet rings.

An object of the present invention is the provision of improved suspension means for a vertical shaft by which hard and brittle magnet rings can be firmly secured in position.

According to the present invention, suspension means for a vertical shaft comprise a ring-like permanent magnet mounted on the shaft and an axially facing ring-like permanent magnet mounted on a housing for the shaft, so that the shaft is supported by magnetic repulsion between the said magnets, each magnet being a close fit about a spigot which locates the magnet against lateral displacement and each magnet being retained in place against displacement axially of the shaft off the end of the spigot substantially completely by magnetic attraction between the magnet and a magnetic body fixedly provided on the shaft or the housing as appropriate.

The invention will now be described, by way of example, with reference to the accompanying drawings, in which.

Figure 1:
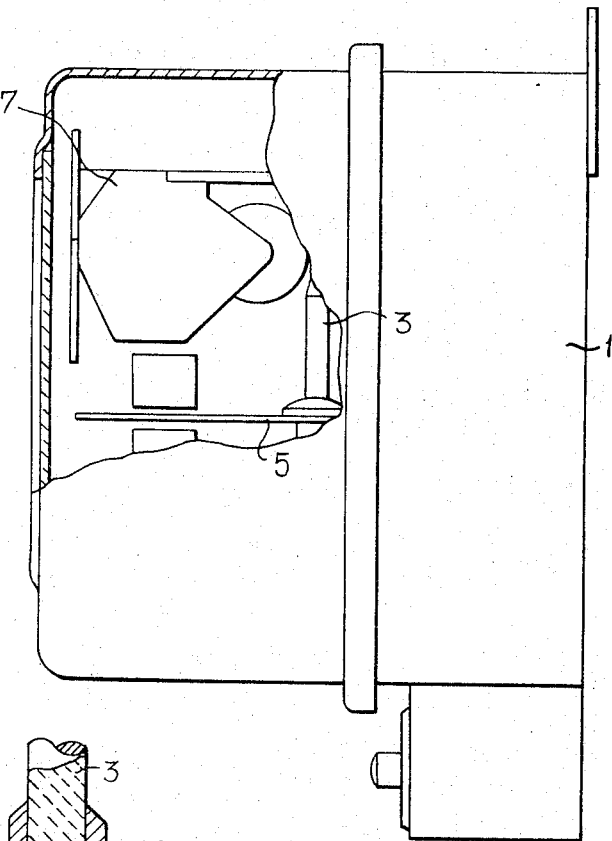
FIGURE 1 is a diagrammatic representation of a watthour electricity meter to which the invention is applied.
Figure 2:
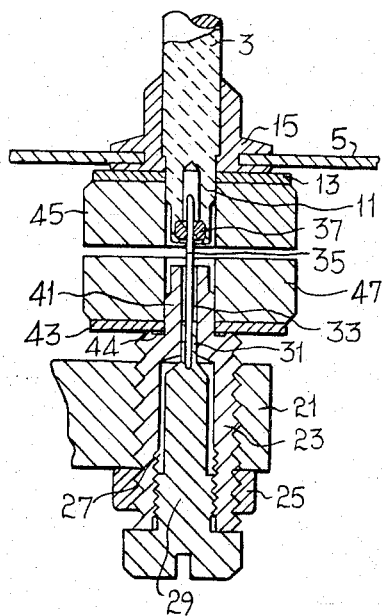
FIGURE 2 is a sectional side elevation of the lower part of a vertical shaft shown in FIGURE 1, and shows the suspension means for that shaft.

Referring first to FIGURE 1, the watthour meter includes a housing 1 in which is supported a vertical shaft 3 positioned against lateral displacement near its upper end by a pin carried by the housing and extending through an apertured carbon disc mounted in the shaft, and at its lower end supported and positioned laterally in a manner described below with reference to FIGURE 2. In orthodox manner, the shaft 3 carries a thin aluminium disc 5 and is caused to rotate by eddy currents set up in the disc by electromagnets energised by the current to be metered, the rotation of the disc being retarded by a brake magnet and the rotations of the disc being counted by an integrating mechanism 7 which provides a visual indication of the units of electricity metered by the meter. Such meters are well known in the art.

The lower end of the shaft (see FIGURE 2) is of reduced diameter and forms a spigot 11 over which is pressed a steel washer 13 that is a tight fit on the spigot and seats against a hub 15 of the disc 5. This hub 15 itself seats against the shoulder at the upper end of the spigot 11, and is die-cast in position on the shaft 3.

Immediately below the shaft 3, a lug 21 of the housing 1 carries an externally screw-threaded plug 23 which is axially adjustable relative to the lug 21 and can be locked in adjusted position by a locknut 25 which engages the lower face of the lug 21. The lower part of plug 23 is formed with an axial bore 27 and the lower part of this bore is screwthreaded to accommodate a screw 29. The upper end of screw 29 is formed as a spigot 31 which is a close fit in a bore 33 through the upper end of the plug 23, and mounted in this spigot is a locating pin 35 extending through an apertured carbon disc 37 mounted in a recess formed in the lower end of the shaft 3, the lip of the recess being spun over to retain the disc in position. This arrangement of locating pin 35 and disc 37 provides a journal bearing, similar to that used at the upper end of the shaft 3, and locating this end of the shaft against lateral movement. The upper end of the plug 23 is formed as a spigot 41, and a steel washer 43 that is a tight fit on the spigot is pressed onto this spigot and butts against a shoulder 44 formed on the plug 23 near the lower end of the spigot.

Figure 3:
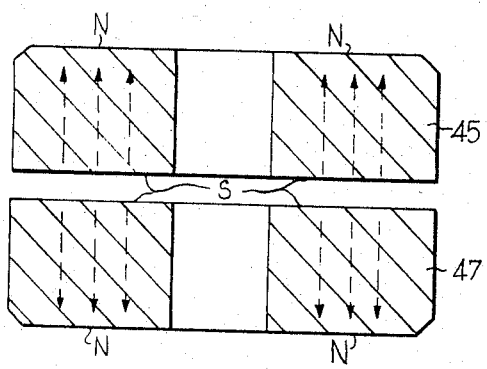
FIGURES 3, 4 and 5 are sectional side elevations of a ring-like permanent magnet shown in FIGURE 2, and illustrate respectively three alternative manners in which that magnet can be magnetised.

Vertical support of the shaft 3 is provided by the magnetic force of repulsion between a ring-like barium ferrite permanent magnet 45 mounted on the spigot 11 of the shaft 3, and a ring-like barium ferrite permanent magnet 47 mounted on the spigot 41 of the plug 23. The manner in which these magnets are magnetised is shown in FIGURE 3, and it will be seen that the upper end of magnet 45 and the lower end of magnet 47 are north poles, while the opposite ends of these magnets are both south poles. The central apertures in these two magnets are of such a size that each magnet is easily fitted onto the associated spigot without risk of fracturing the magnet while providing a positive location of the magnet against lateral displacement. Each magnet is retained in position by magnetic attraction between the magnet and the steel washer.

In use of the meter, the force of repulsion between magnets 45 and 47 supports the shaft 3, and since in the case of each magnet the direction of this force is such as to force the magnet against its backing steel washer, the force of magnetic attraction between the magnet and the washer, which is relied upon to keep the magnet in place, is not required to overcome any operational forces.

Figure 4:
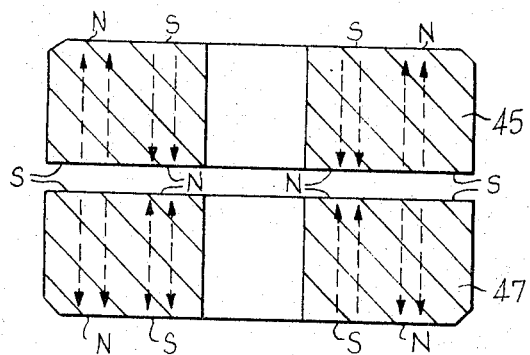

Referring now to FIGURE 4, in order to improve the effectiveness of the two magnets 45 and 47, each is so magnetised that the end directed towards the outer magnet has an annular north pole and a concentric annular south pole. This is effected by magnetising an outer annular part of the ring in one axial direction and the inner annular part of the ring in the opposite axial direction.

Figure 5:
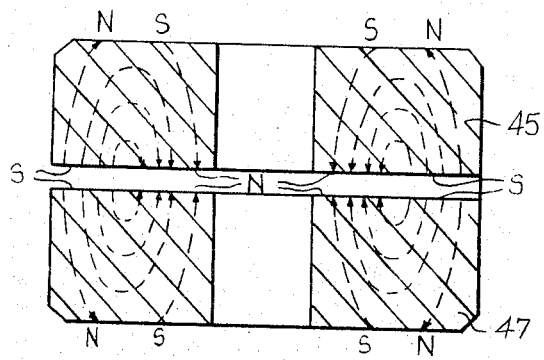

FIGURE 5 illustrates a manner of magnetisation of these two magnets 45 and 47 which provides concentric north and south poles at one axial end of each magnet but only weak poles at the other end of the magnet.

It is not essential that each magnet shall be in direct contact with the steel washer to which it is attracted, and if desired a metal non-magnetic washer or an electrically insulating non-magnetic washer may be interposed between the magnet and the steel washer to provide better control of the flux passing between the magnet and the steel washer.

Barium ferrite permanent magnets produce a magnetic field which is affected considerably by the ambient temperature, and in at least some of the arrangements described above a compensating effect can be produced by making the washers of a steel, or other material, which tends to compensate for temperature-induced changes in the characteristics of the permanent magnets. For example, in the arrangement shown in FIGURES 4 and 5, in which the steel washer forms part of the magnetic circuit, such a compensating effect is readily obtainable.

It is possible in most cases to avoid the need for any grinding of the fired magnets, by using the novel magnet mounting arrangement described above.

A further application of the invention is to vertical relay shafts.

What I claim is:
1. Suspension means for a vertical shaft comprising:
   (a) a first spigot provided on the shaft;
   (b) a first magnetic body fixedly provided on the shaft adjacent the first spigot;
   (c) a first ring-like permanent magnet mounted on, and a close fit about, the first spigot, and held in place axially of the first spigot by magnetic attraction to the first magnetic body;
   (d) a housing for the shaft;
   (e) a second spigot provided in the housing;
   (f) a second magnetic body fixedly provided in the housing adjacent the second spigot; and
   (g) a second ring-like permanent magnet mounted on, and a close fit about, the second spigot, and held in place axially of the second spigot by magnetic attraction to the second magnetic body;
the shaft being supported in a freely rotatable manner by magnetic repulsion between the first and second magnets.

2. Suspension means according to claim 1, in which each of the said magnets consists of a sintered mixture of ferrite powder and binding material.

3. Suspension means according to claim 1, in which said first magnetic body provided on the shaft is a first separate component secured to the shaft in a manner preventing movement of said first separate component axially of the shaft.

4. Suspension means according to claim 3, in which said first separate component is mounted on the shaft by a tight press fit.

5. Suspension means according to claim 4, in which said first separate component is a steel washer.

6. Suspension means according to claim 3, in which a planar surface is provided on the shaft and extends perpendicular to the axis of rotation of the shaft, and said first separate component seats against the planar surface and is thereby reinforced against axial movement away from the end of the first spigot.

7. Suspension means according to claim 6, in which the planar surface is part of a member of non-magnetic material which is carried by the shaft and located against axial movement relative to the shaft.

8. Suspension means according to claim 1, in which each magnet is magnetised axially so that one axial end has a north pole and the other axial end has a south pole.

9. Suspension means according to claim 1, in which each magnet is so magnetised that the axial end directed towards the other ring-like magnet has an annular north pole and a concentric annular south pole, and the magnetic body serves as a magnetic bridge between the north and south poles of the other axial end of the magnet.

10. Suspension means according to claim 1, in which the magnetic body provided on the housing is a second separate component which is mounted adjacent the second spigot in a manner preventing, in use, movement of the second separate component axially of the shaft.

11. Suspension means according to claim 10, in which the second separate component is mounted on the second spigot by a tight press fit.

12. Suspension means according to claim 11, in which said second separate component is a steel washer.

13. Suspension means according to claim 10, in which a planar surface is provided in the housing and extends perpendicular to the axis of rotation of the shaft, and said second separate component seats against the planar surface provided in the housing and is thereby reinforced against axial movement away from the end of the second spigot.

14. Suspension means according to claim 13, in which the housing is provided with a spigot support member, and the planar surface provided in the housing is situated at a shoulder where the second spigot projects from the spigot support member.

15. Suspension means according to claim 14, in which the spigot support member is in screw-threaded engagement with the housing and is movable relative to the housing, and axially of the shaft, during adjustment of the suspension means.

16. A watthour electricity meter including suspension means according to claim 1.

17. A vertical electrical relay including suspension means according to claim 1.

References Cited

UNITED STATES PATENTS

| 2,254,698 | 9/1941 | Hansen | 308—10 |
| 3,107,948 | 10/1963 | Lovegrove | 303—10 |

MILTON, O. HIRSHFIELD, *Primary Examiner.*

L. L. SMITH, *Assistant Examiner.*